(12) United States Patent
Fan

(10) Patent No.: US 12,487,873 B2
(45) Date of Patent: Dec. 2, 2025

(54) SELECTING TARGET COMPONENTS OF COMPUTING DEVICES FOR LOGGING

(71) Applicant: Dell Products L.P., Round Rock, TX (US)

(72) Inventor: Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 18/123,576

(22) Filed: Mar. 20, 2023

(65) Prior Publication Data

US 2024/0303145 A1    Sep. 12, 2024

(30) Foreign Application Priority Data

Mar. 7, 2023   (CN) .......................... 202310224485.1

(51) Int. Cl.
   *G06F 11/00*    (2006.01)
   *G06F 11/07*    (2006.01)

(52) U.S. Cl.
   CPC ...... *G06F 11/0766* (2013.01); *G06F 11/0709* (2013.01); *G06F 11/079* (2013.01); *G06F 11/0793* (2013.01)

(58) Field of Classification Search
   CPC ............. G06F 11/0766; G06F 11/0709; G06F 11/079; G06F 11/0793
   See application file for complete search history.

(56) References Cited

U.S. PATENT DOCUMENTS

| | | | |
|---|---|---|---|
| 10,244,075 B2 * | 3/2019 | Fujiwara | G06Q 10/06 |
| 11,438,432 B2 * | 9/2022 | Wilkinson | H04L 67/568 |
| 11,921,187 B1 * | 3/2024 | Russell | G01S 7/539 |
| 11,983,639 B2 * | 5/2024 | Das | G06Q 10/0633 |
| 12,056,006 B1 * | 8/2024 | Bishop | G06F 11/0793 |
| 12,099,417 B1 * | 9/2024 | Paulraj | G06F 11/1471 |
| 12,159,039 B2 * | 12/2024 | Kerstetter | G06F 3/0679 |
| 12,189,463 B2 * | 1/2025 | Gandhi | G06F 11/0769 |

(Continued)

OTHER PUBLICATIONS

K. Hammouda et al., "A Comparative Study of Data Clustering Techniques," International Research Journal of Engineering and Technology, May 2017, 21 pages.

(Continued)

*Primary Examiner* — Loan L.T. Truong
(74) *Attorney, Agent, or Firm* — Ryan, Mason & Lewis, LLP

(57) ABSTRACT

An apparatus comprises a processing device configured to detect a given issue encountered on a given computing device, to identify a given cluster of computing devices to which the given computing device belongs, and to determine a similarity between the given issue encountered on the given computing device and one or more historical issues encountered on one or more other computing devices belonging to the given cluster. The processing device is also configured to select, based at least in part on the determined similarity between the given issue and the one or more historical issues, a subset of a plurality of components of the given computing device as target components for log collection. The processing device is further configured to collect logs from the target components and to perform remedial actions determined utilizing the collected logs on the given computing device to resolve the given issue.

20 Claims, 10 Drawing Sheets

(56) References Cited

U.S. PATENT DOCUMENTS

| | | | |
|---|---|---|---|
| 12,223,041 B2* | 2/2025 | Chen Kaidi | G06F 21/552 |
| 12,332,736 B2* | 6/2025 | Oh | H04L 41/14 |
| 2010/0088693 A1* | 4/2010 | Vulugundam | G06F 8/65 |
| | | | 717/173 |
| 2018/0322447 A1* | 11/2018 | Cantrell | G06Q 10/087 |
| 2023/0410037 A1* | 12/2023 | Jenkins | G06Q 10/087 |
| 2024/0248790 A1* | 7/2024 | Verma | G06F 11/0709 |
| 2024/0264923 A1* | 8/2024 | Fauber | G06F 11/079 |

OTHER PUBLICATIONS

J. Han et al., "Data Mining: Concepts and Techniques," Third Edition, Morgan Kaufmann, Jun. 2011, 560 pages.

M. A. Carreira-Perpiñán, "A Review of Mean-shift Algorithms for Clustering," arXiv:1503.00687v1, Mar. 2, 2015, 28 pages.

* cited by examiner

| FIELD | VALUE |
|---|---|
| DEFECT | <DEFECT IDENTIFIER> |
| TYPE | <TYPE> |
| COMPONENT | <AFFECTED COMPONENTS> |
| MODULE | <PATH TO CODE FILE HAVING BUG> |
| LINE | <LINE AT WHICH BUG OCCURS> |
| METHOD | <METHOD HAVING BUG> |
| ASSERT | <ASSERTION STATEMENT> |
| STACK | ...<br><CODE STACK><br>... |

SELECTING TARGET COMPONENTS OF COMPUTING DEVICES FOR LOGGING

RELATED APPLICATION

The present application claims priority to Chinese Patent Application No. 202310224485.1, filed on Mar. 7, 2023 and entitled "Selecting Target Components of Computing Devices for Logging," which is incorporated by reference herein in its entirety.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems. Similar challenges arise in other types of information processing systems.

SUMMARY

Illustrative embodiments of the present disclosure provide techniques for selecting target components of computing devices for logging.

In one embodiment, an apparatus comprises at least one processing device comprising a processor coupled to a memory. The at least one processing device is configured to detect a given issue encountered on a given one of a plurality of computing devices in an information technology infrastructure, to identify a given one of a set of two or more different clusters of the plurality of computing devices to which the given computing device belongs, and to determine a similarity between the given issue encountered on the given computing device and one or more historical issues encountered on one or more other ones of the plurality of computing devices belonging to the given cluster. The at least one processing device is also configured to select, based at least in part on the determined similarity between the given issue encountered on the given computing device and the one or more historical issues encountered on the one or more other ones of the plurality of computing devices belonging to the given cluster, a subset of a plurality of components of the given computing device as one or more target components for log collection. The at least one processing device is further configured to collect logs from the one or more target components of the given computing device and to perform one or more remedial actions on the given computing device to resolve the given issue, the one or more remedial actions being determined based at least in part on the logs collected from the one or more target components of the given computing device.

These and other illustrative embodiments include, without limitation, methods, apparatus, networks, systems and processor-readable storage media.

BRIEF DESCRIPTION OF THE DRAWINGS

FIG. 6 shows a footprint of a bug encountered on an edge node in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
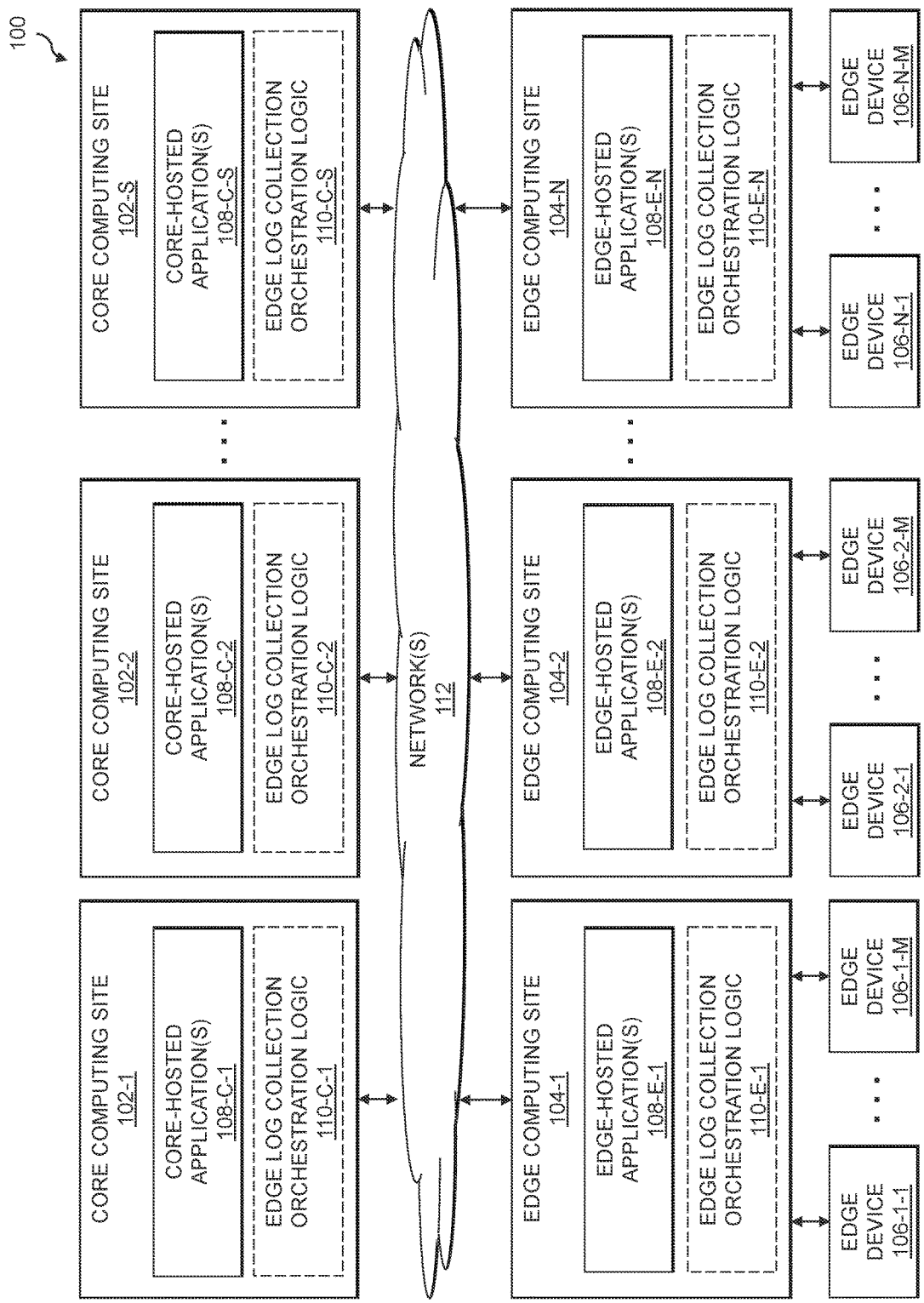
FIG. 1 is a block diagram of an information processing system configured for selecting target components of computing devices for logging in an illustrative embodiment.

FIG. 1 shows an information processing system 100 configured in accordance with an illustrative embodiment. The information processing system 100 is assumed to be built on at least one processing platform and provides functionality for selecting target components of computing devices (e.g., edge computing devices) for logging. The target components may be, for example, one or more specific log collection tools which run on or which are associated with a given computing device. The target components may also or alternatively include one or more specific hardware and/or software components of a given computing device. The target components may further or alternatively include particular data or metrics which are available from one or more specific hardware and/or software components of a given computing device, or particular types of data or metrics which may be collected from one or more specific log collection tools which run on or which are associated with a given computing device, etc.

The information processing system 100 comprises a set of core computing sites 102-1, 102-2, . . . 102-S (collectively, core computing sites 102) and a set of edge computing sites 104-1, 104-2, . . . 104-N (collectively, edge computing sites 104, also referred to as edge computing nodes or edge data centers 104). The core computing sites 102, also referred to as core data centers 102, are assumed to comprise a plurality of core devices or core nodes (not shown in FIG. 1) that run sets of core-hosted applications 108-C-1, 108-C-2, . . . 108-C-S (collectively, core-hosted applications 108-C). In some embodiments, the core computing sites 102 comprise or are part of one or more cloud computing platforms, and may include one or more clouds on which the core-hosted applications 108-C run. In such embodiments, the core-hosted applications 108-C may alternatively be referred to as cloud-hosted applications 108-C. Each of the edge computing sites 104 is assumed to comprise compute infrastructure or edge assets (not shown in FIG. 1) that run sets of edge-hosted applications 108-E-1, 108-E-2, . . . 108-E-N (collectively, edge-hosted applications 108-E). The core-hosted applications 108-C and edge-hosted applications 108-E are collectively referred to as applications 108. As used herein, the term "application" is intended to be broadly construed to include applications, microservices, and other types of services.

The information processing system 100 includes a plurality of edge devices that are coupled to each of the edge computing sites 104. A set of edge devices 106-1-1, . . . 106-1-M (collectively, edge devices 106-1) are coupled to edge computing site 104-1, a set of edge devices 106-2-1, . . . 106-2-M (collectively, edge devices 106-2) are coupled to edge computing site 104-2, and a set of edge devices 106-N-1, . . . 106-N-M (collectively, edge devices 106-N) are coupled to edge computing site 104-N. The edge devices 106-1, 106-2, . . . 106-N are collectively referred to as edge devices 106. It should be appreciated that the particular number "M" of edge devices 106 that are connected to each of the edge computing sites 104 may be different. In other words, the number M of edge devices 106-1 coupled to the edge computing site 104-1 may be the same as or different than the number M of edge devices 106-2 coupled to the edge computing site 104-2. Further, a particular one of the edge devices 106 may be connected or coupled to only a single one of the edge computing sites 104 at any given time, or may be coupled to multiple ones of the edge computing sites 104 at any given time, or may be connected to different ones of the edge computing sites 104 at different times.

The edge devices 106 may comprise, for example, physical computing devices such as Internet of Things (IoT) devices, sensor devices (e.g., for telemetry measurements, videos, images, etc.), mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The edge devices 106 may also or alternately comprise virtualized computing resources, such as virtual machines (VMs), containers, etc. In this illustration, the edge devices 106 may be tightly coupled or loosely coupled with other devices, such as one or more input sensors and/or output instruments (not shown). Couplings can take many forms, including but not limited to using intermediate networks, interfacing equipment, connections, etc.

The edge devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

As shown in FIG. 1, the edge computing sites 104 are connected to the core computing sites 102 via one or more networks 112. Although not explicitly shown, the edge devices 106 may be coupled to the edge computing sites 104 via the networks 112. The networks 112 coupling the core computing sites 102, the edge computing sites 104 and the edge devices 106 are assumed to comprise a global computer network such as the Internet, although other types of private and public networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the edge devices 106 to the edge computing sites 104, while a second type of network (e.g., a private network) couples the edge computing sites 104 to the core computing sites 102. Various other examples are possible.

In some embodiments, one or more of the core computing sites 102 and one or more of the edge computing sites 104 collectively provide at least a portion of an information technology (IT) infrastructure operated by an enterprise, where the edge devices 106 are operated by users of the enterprise. The IT infrastructure comprising such core computing sites 102 and edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of one or more of the core computing sites 102 and/or one or more of the edge computing sites 104. A given enterprise system may host assets that are associated with multiple enterprises (e.g., two or more different businesses, organizations or other entities). In another example embodiment, one or more of the edge computing sites 104 may be operated by enterprises that are separate from, but communicate with, enterprises which operated the one or more core computing sites 102.

Although not explicitly shown in FIG. 1, one or more input-output devices such as keyboards, displays or other types of input-output devices may be used to support one or more user interfaces to the core computing sites 102, the edge computing sites 104 and the edge devices 106, as well as to support communication between the core computing sites 102, the edge computing sites 104, the edge devices 106, and other related systems and devices not explicitly shown.

As noted above, the core computing sites 102 host core-hosted applications 108-C and the edge computing sites 104 host edge-hosted applications 108-E, where the core-hosted applications 108-C and the edge-hosted applications 108-E are collectively referred to as applications 108. The edge devices 106 may exchange information with the applications 108. For example, the edge devices 106 or edge-hosted applications 108-E may send information to the core-hosted applications 108-C. In some embodiments, such information includes logs which are used for analysis and remediation of issues which are encountered on different ones of the edge devices 106. The edge devices 106 or edge-hosted applications 108-E may also receive information (e.g., such as instructions) from the core-hosted applications 108-C. In some embodiments, such information or instructions may include root cause information for the issues encountered on different ones of the edge devices 106, remediation actions to be taken for the issues encountered on different ones of the edge devices 106, target components of the edge devices 106 from which logs should be obtained for processing of encountered issues, etc. Using the technical solutions described herein, the edge computing sites 104 are configured to process and publish customized selected, authorized and processed information to the core-hosted applications 108-C (e.g., logs collected for target components of the edge devices 106 on which issues are encountered) as described in further detail elsewhere herein.

It should be noted that, in some embodiments, requests and responses or other information may be routed through multiple edge computing sites. While FIG. 1 shows an embodiment where each edge computing site 104 is connected directly to the core computing sites 102 via the networks 112, this is not a requirement. In other embodiments, one or more of the edge computing sites 104 may be connected to one or more of the core computing sites 102 via one or more other ones of the edge computing sites 104 (e.g., the edge computing sites 104 may be arranged in a hierarchy with multiple levels, possibly including one or more edge data centers that couple the edge computing sites 104 with the core computing sites 102).

When issues are encountered on the edge devices 106, various log data may be collected from the edge devices 106 and provided to the edge-hosted applications 108-E and/or the core-hosted applications 108-C for processing. Such processing may include analyzing such log data to identify the root causes of encountered issues, and for identifying remedial actions for fixing the encountered issues. Such remedial actions may include, but are not limited to, actions that modify the configuration of the edge devices 106 such that similar issues are not encountered in the future. The edge devices 106 may have limited available resources, such that collecting all possible logs from the edge devices 106 when issues are encountered may lead to significant performance impacts for the edge devices 106. The edge computing sites 104 and the core computing sites 102 may implement edge log collection orchestration logic that provides for dynamic determination of target components of the edge devices 106 from which log data should be collected for processing different encountered issues at the core computing sites 102 and the edge computing sites 104.

In some embodiments, log data that is produced at different ones of the edge devices 106 is to be consumed by different endpoints. The endpoints may be other ones of the edge devices 106, one or more of the edge computing sites 104, one or more of the core computing sites 102, or one or more other processing devices that are coupled to the edge computing sites 104 (e.g., Internet-connected client devices coupled to the networks 112, not shown in FIG. 1). The collection and processing of such log data may be facilitated by edge log collection orchestration logic 110-E-1, 110-E-2, . . . 110-E-N (collectively, edge log collection orchestration logic 110-E) at the edge computing sites 104, and by edge log collection orchestration logic 110-C-1, 110-C-2, . . . 110-C-S (collectively, edge log collection orchestration logic 110-C) at the core computing sites 102. The edge log collection orchestration logic 110-C and 110-E (collectively, edge log collection orchestration logic 110), for example, may be used to identify target components of the edge devices 106 from which log data should be collected for different encountered issues.

In some embodiments, edge data from the edge devices 106 may be stored in a database or other data store (not shown), either locally at the edge computing sites 104 and/or in processed or transformed format at different endpoints (e.g., the core computing sites 102, the edge computing sites 104, other ones of the edge devices 106, etc.). The database or other data store may be implemented using one or more of storage systems that are part of or otherwise associated with one or more of the core computing sites 102, the edge computing sites 104, and the edge devices 106. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the core computing sites 102 and the edge computing sites 104 in this embodiment, the edge log collection orchestration logic 110 in other embodiments can be implemented at least in part externally to the core computing sites 102 and/or the edge computing sites 104, for example, as a stand-alone server, set of servers or other type of system coupled via the one or more networks 112 to one or more of the core computing sites 102 and/or the edge computing sites 104. In some embodiments, the edge log collection orchestration logic 110 may be implemented at least in part within one or more of the edge devices 106. In still other embodiments, the edge log collection orchestration logic 110 may be implemented at a subset of the core computing sites 102 and the edge computing sites 104, rather than having instances implemented at each of the core computing sites 102 and each of the edge computing sites 104. Various other examples are possible.

The core computing sites 102 and the edge computing sites 104 in the FIG. 1 embodiment are assumed to be implemented using at least one processing device. Each such processing device generally comprises at least one processor and an associated memory, and implements at least a portion of the functionality of the edge log collection orchestration logic 110.

It is to be appreciated that the particular arrangement of the core computing sites 102, the edge computing sites 104, the edge devices 106, the applications 108, the edge log collection orchestration logic 110 and the networks 112 illustrated in the FIG. 1 embodiment is presented by way of example only, and alternative arrangements can be used in other embodiments. As discussed above, for example, the edge log collection orchestration logic 110 may be implemented external to one or both of the core computing sites 102 and the edge computing sites 104. At least portions of the edge log collection orchestration logic 110 may be implemented at least in part in the form of software that is stored in memory and executed by a processor.

It is to be understood that the particular set of elements shown in FIG. 1 for selecting target components of computing devices for logging is presented by way of illustrative example only, and in other embodiments additional or alternative elements may be used. Thus, another embodiment may include additional or alternative systems, devices and other network entities, as well as different arrangements of modules and other components.

The core computing sites 102, the edge computing sites 104, the edge devices 106 and other portions of the system 100, as described above and in further detail below, may be part of cloud infrastructure.

The core computing sites 102, the edge computing sites 104, the edge devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The core computing sites 102, the edge computing sites 104, and the edge devices 106, or components thereof, may be implemented on respective distinct processing platforms, although numerous other arrangements are possible. For example, in some embodiments at least portions of the edge devices 106 and the edge computing sites 104 may be implemented on the same processing platform. One or more of the edge devices 106 can therefore be implemented at least in part within at least one processing platform that implements at least a portion of the edge computing sites 104 and/or the core computing sites 102. In other embodiments, one or more of the edge devices 106 may be separated from but coupled to one or more of the edge computing sites 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the core computing sites 102, the edge computing sites 104 and the edge devices 106, or portions or components thereof, to reside in different data centers. Numerous other distributed implementations are possible.

Additional examples of processing platforms utilized to implement the core computing sites 102, the edge computing sites 104 and the edge devices 106 and other components of the system 100 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for selecting target components of computing devices for logging will now be described in more detail with reference to the flow diagram of FIG. 2. It is to be understood that this particular process is only an example, and that additional or alternative processes for selecting target components of computing devices for logging may be used in other embodiments.

In this embodiment, the process includes steps 200 through 210. These steps are assumed to be performed by the edge computing sites 104 and possibly the core computing sites 102 utilizing the edge log collection orchestration logic 110. The process begins with step 200, detecting a given issue encountered on a given one of a plurality of computing devices. A given one of a set of two or more different clusters of the plurality of computing devices to which the given computing device belongs is identified in step 202. Step 202 may include utilizing a mean-shift clustering algorithm.

A similarity between the given issue encountered on the given computing device and one or more historical issues encountered on one or more other ones of the plurality of computing devices belonging to the given cluster is determined in step 204. Each of the historical issues may be associated with a root cause and at least one remedial action for resolving that historical issue. Each of the historical issues may also or alternatively be linked with one or more target components that are a source of logs having information used for diagnosing the one or more historical issues.

Step 204 may comprise, for a given one of the one or more historical issues encountered on at least one of the one or more other ones of the plurality of computing devices belonging to the given cluster, generating a first data structure comprising a plurality of fields describing the given issue and computing a similarity metric between the first data structure and a second data structure comprising the plurality of fields describing the given historical issue. Computing the similarity metric may comprise computing a cosine similarity between the first and second data structures. The plurality of fields may comprise at least one of identifier of an error occurring on the given computing device, at least one identifier of a code file that is the source of the error occurring on the given computing device, and at least one identifier of a location in the code file that is a cause of the error occurring on the given computing device. The plurality of fields may also or alternatively comprise at least one identifier of one or more software components running on the given computing device that are affected by the given issue occurring on the given computing device.

In step 206, a subset of a plurality of components of the given computing device are selected as target components for log collection based at least in part on the determined similarity between the given issue encountered on the given computing device and the one or more historical issues encountered on the one or more other ones of the plurality of computing devices belonging to the given cluster. In some embodiments, step 204 includes determining whether any of the one or more historical issues exhibit at least a first threshold level of similarity to the given issue and, responsive to determining that none of the one or more historical issues exhibit at least the first threshold level of similarity to the given issue, determining whether any of the one or more historical issues exhibit at least a second threshold level of similarity to the given issue, the second threshold level of similarity being less than the first threshold level of similarity. Step 206 may comprise selecting target components that are linked with ones of the one or more historical issues having at least the first threshold level of similarity with the given issue. Step 206 may also or alternatively comprise selecting target components that are linked with a subset of the one or more historical issues exhibiting at least the second threshold level of similarity with the given issue.

Figure 2:
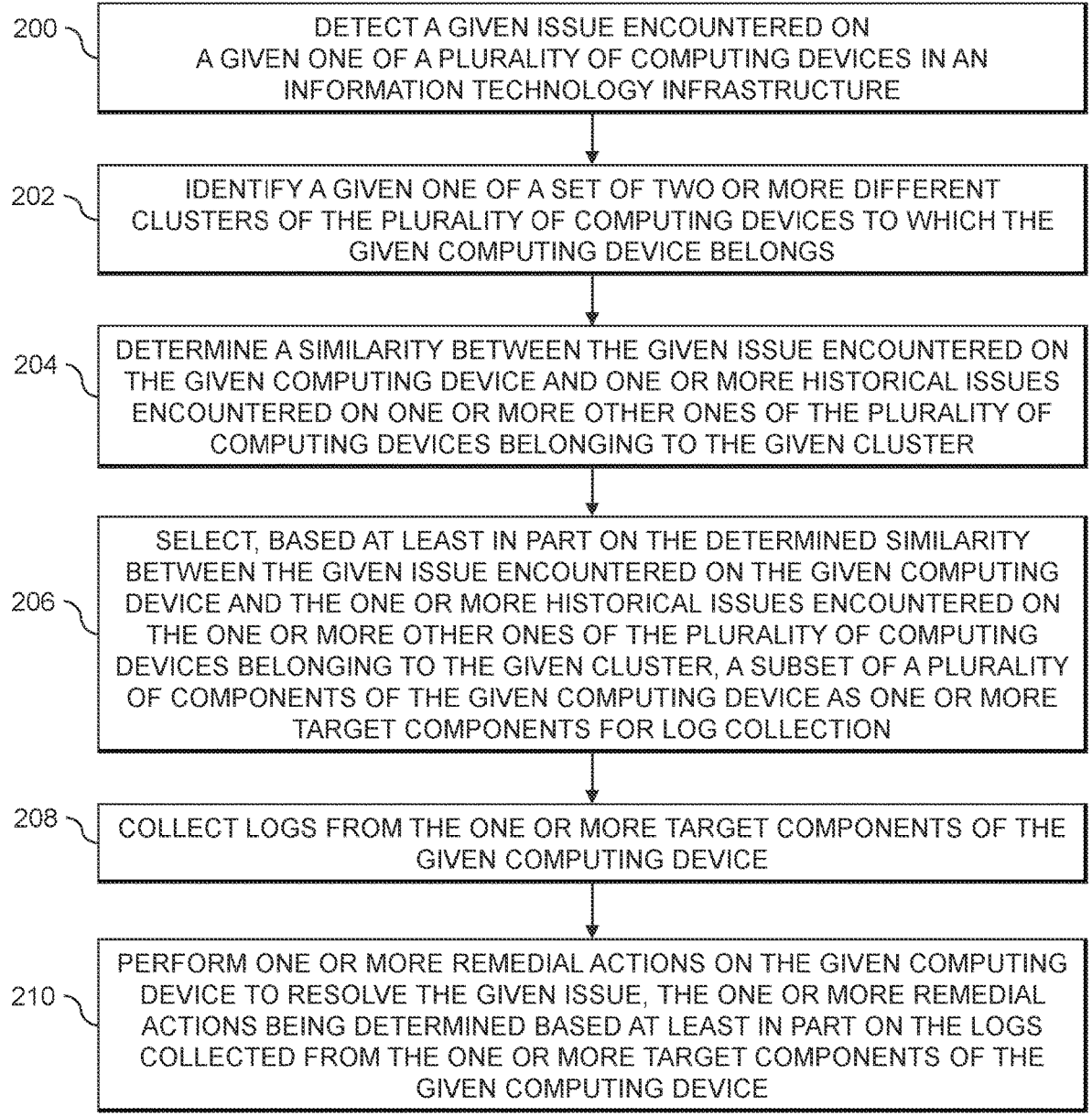
FIG. 2 is a flow diagram of an exemplary process for selecting target components of computing devices for logging in an illustrative embodiment.

The FIG. 2 process continues with step 208, collecting logs from the target components of the given computing device. In step 210, one or more remedial actions are performed on the given computing device to resolve the given issue, the one or more remedial actions being determined based at least in part on the logs collected from the target components of the given computing device. At least one of the one or more remedial actions may comprise performing a root cause analysis of the given issue utilizing the logs collected from the target components of the given computing device. At least one of the one or more remedial actions may comprise applying one or more patches to update one or more software components of the given computing device which are determined, via analysis of the logs collected from the target components of the given computing device, to be a source of the given issue.

Cloud computing plays a significant role in making improved decisions, and offers various benefits including reduced IT costs and scalability. Edge computing is another option, which can offer some benefits relative to cloud computing such as faster response time and increased data security. As IoT and other types of edge devices become more widespread and powerful, organizations will need to implement effective edge computing architectures to leverage the potential of edge computing technology.

Figure 3:
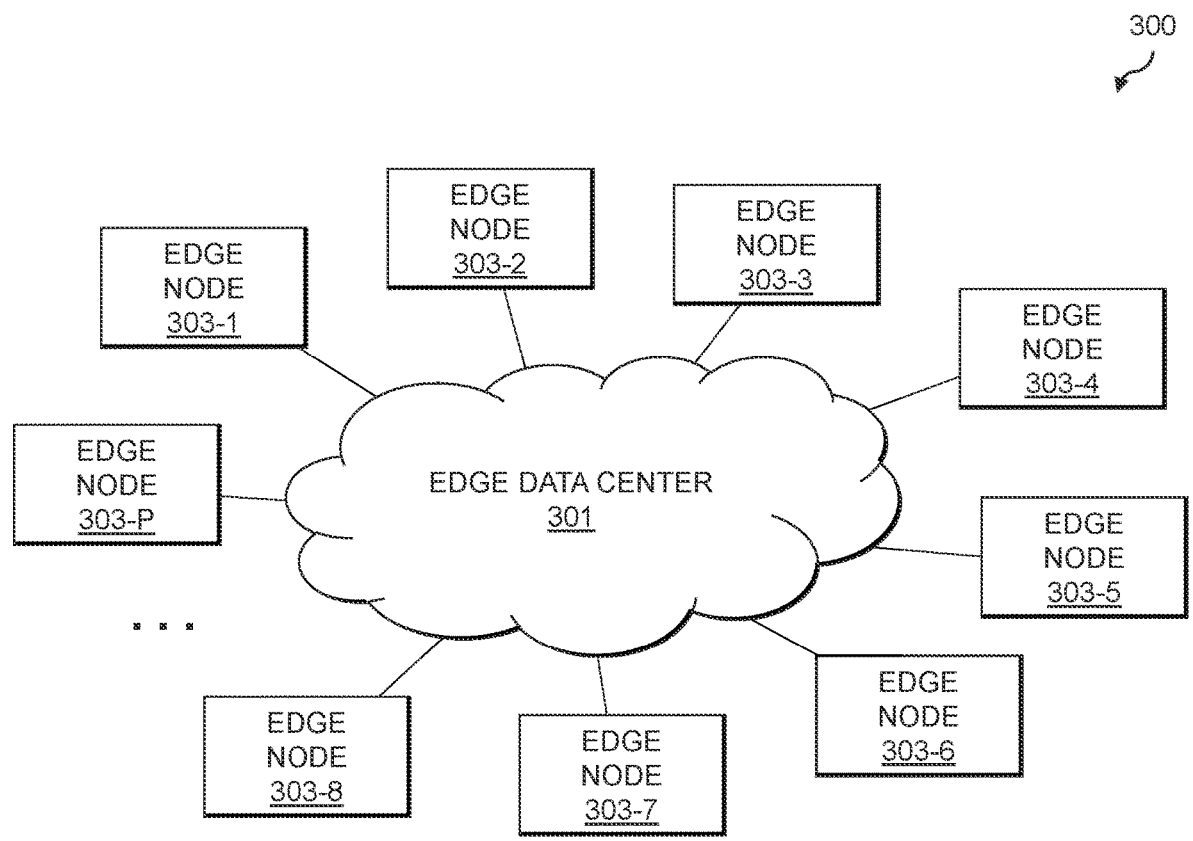
FIG. 3 shows an edge computing architecture including an edge data center coupled to edge nodes in an illustrative embodiment.

Generally, in a hybrid edge network there are multiple edge computing nodes (also referred to as edge nodes) which are located at different sites. The edge nodes typically have limited storage and processing ability relative to core computing nodes and cloud computing infrastructure. FIG. 3 shows an edge computing architecture 300 including an edge data center 301 which is coupled to a set of edge nodes 303-1, 303-2, . . . 303-P (collectively, edge nodes 303). When a "bug" is encountered on a given one of the edge nodes 303 (e.g., edge node 303-1), it is important but also resource-consuming to collect the needed logs from the given edge node 303-1 in order to diagnose and remediate the bug. As used herein, a bug or error is an example of what is more generally referred to as an issue. Such logs, for example, may be provided from the given edge node 303-1 to the edge data center 301 for debugging or other analysis (e.g., diagnosis, determining remedial action for correcting the bug, etc.).

Collecting too many logs may cause heavy stress on the relatively limited resources of the given edge node 303-1, which can impact the normal functioning of the given edge node 303-1. Collecting too few logs, however, can lead to missing or losing potentially critical information which is needed for finding the root cause of bugs. Illustrative embodiments provide technical solutions for an optimal or improved edge node log collection mechanism. The technical solutions described herein can provide benefits for resource savings of the edge nodes 303, faster handling and debugging of bugs by the edge data center 301 that the edge nodes 303 are coupled to, etc. In some embodiments, the edge node log collection mechanism first pre-categorizes the edge nodes 303 (e.g., using a mean-shift algorithm). When a given bug occurs on the given node 303-1, a given category to which the given edge node 303-1 belongs is identified. A given pool of historical bugs encountered on the edge nodes 303 in the given category are then collected. Similarity scores between the given bug encountered on the given edge node 303-1 and the historical bugs in the given pool of historical issues or errors are then determined. The similarity scores are used to match the given bug to historical bugs and determine the target components to be used for log collection from the given edge node 303-1. The technical solutions described herein thus enable improved and more efficient collection of critical and necessary logs for debugging while minimizing or reducing the impact to system performance of the edge nodes 303. Further, accurate component logs also help the edge data center 301 to more quickly analyze bugs to improve debugging processes.

Figure 4:
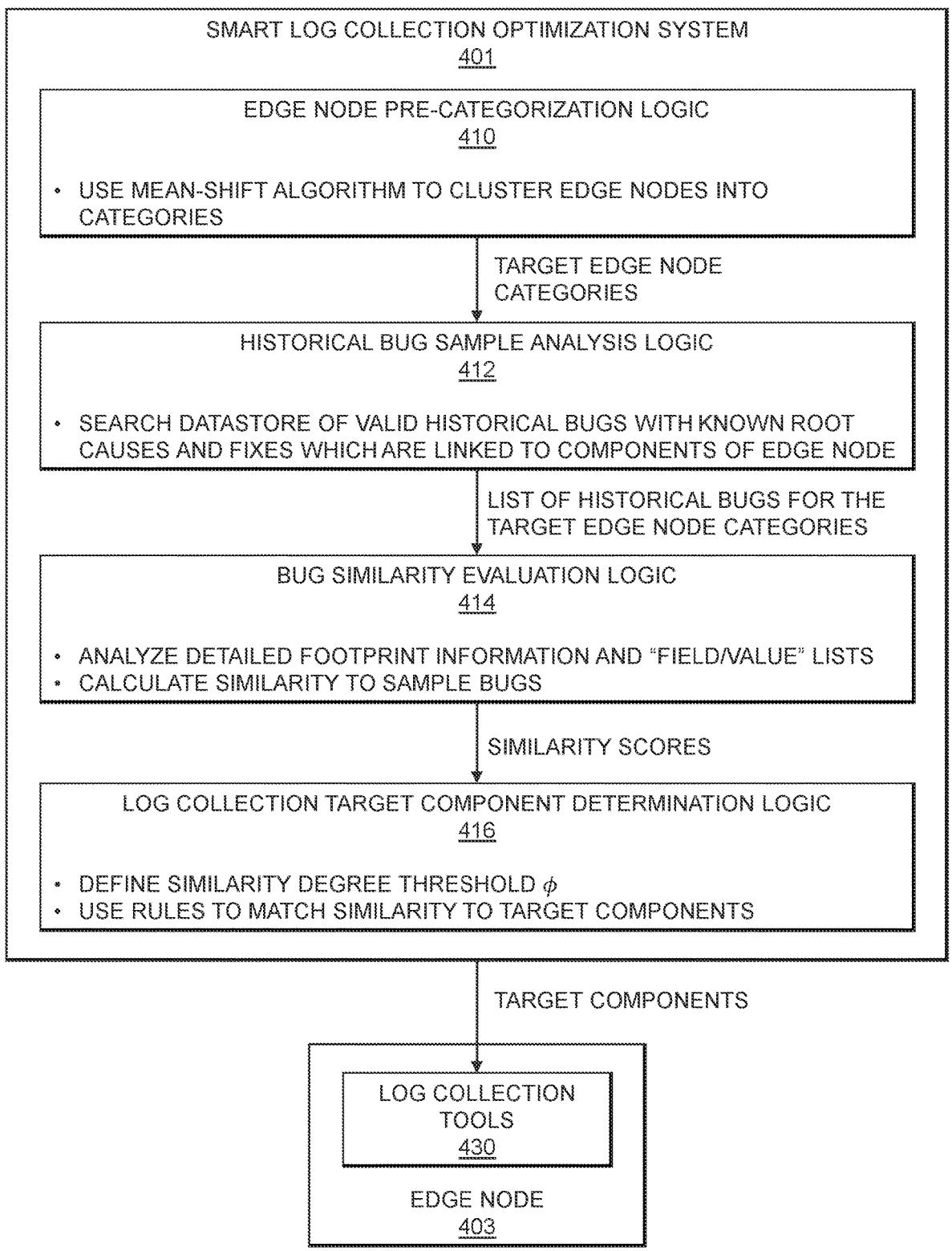
FIG. 4 shows a smart log collection optimization system configured to determine target components of an edge node for logging in an illustrative embodiment.

FIG. 4 shows a smart log collection optimization system 401 which is coupled to an edge node 403. It is assumed that the edge node 403 has encountered a bug that is to be remediated at least in part through analysis of one or more logs collected utilizing log collection tools 430 which run on or are otherwise associated with the edge node 403. The smart log collection optimization system 401 implements edge node pre-categorization logic 410, historical bug sample analysis logic 412, bug similarity evaluation logic 414, and log collection target component determination logic 416. The edge node pre-categorization logic 410, as will be discussed in further detail below, is configured to cluster edge nodes into different categories. In some embodiments, the edge nodes are clustered utilizing a mean-shift algorithm. The smart log collection optimization system 401, in response to detecting that the edge node 403 has encountered a bug, determines one or more target edge node categories to which the edge node 403 belongs. The target edge node categories are then provided to the historical bug sample analysis logic 412.

The historical bug sample analysis logic 412 is configured to search a datastore or database of valid historical bugs (e.g., with known root causes and associated fixes which are linked to particular components of the edge nodes) encountered by edge nodes in the target edge node categories. A list of such historical bugs for the target edge node categories is then provided to the bug similarity evaluation logic 414. The bug similarity evaluation logic 414 is configured to analyze detailed footprint information and field/value lists for the bug encountered on the edge node 403, and calculates similarity scores (e.g., using cosine similarity) between this footprint and the sample bugs in the list of historical bugs for the target edge node categories. The bug similarity evaluation logic 414 provides the similarity scores to the log collection target component determination logic 416. The log collection target component determination logic 416 is configured to follow rules to match and determine the target components of the edge node 403 from which logs should be collected. This may include defining a similarity degree threshold ¢ which is used in various rules for matching the similarity to target components. The determined target components are then sent to the log collection tools 430 of the edge node 403, such that logs for such target components are collected and used to analyze the bug encountered on the edge node 403.

Functionality of the edge node pre-categorization logic 410 will now be described in further detail. The edge node pre-categorization process is important, because it determines the future error learning's accuracy. The more similar the edge nodes within a given category, the more learning value they have for determining the target components from which logs should be collected for analyzing a newly encountered bug. In some embodiments, the edge node pre-categorization logic 410 uses a mean-shift algorithm for clustering edge nodes into different groups or categories. Suppose that there are M attributes for each node, represented as $X=\{x_1, x_2, \ldots, x_M\}$ for edge node X. For example, in an intelligent irrigation system scenario, there might be different sensor-generated data such as temperature, humidity, soil moisture, ontology decision, light, rain, flow, etc. The mean-shift algorithm is used to cluster the edge nodes, which can better cluster the edge nodes into a number of groups where the number of groups is not predefined.

Mean-shift clustering is an unsupervised learning algorithm that assigns data points to clusters iteratively by shifting points towards the mode (e.g., where the mode is the highest density of data points in a region in the context of mean-shift). Unlike a k-means clustering algorithm, mean-shift does not require specifying the number of clusters in advance. The number of clusters is determined by the mean-shift algorithm with respect to the data, and thus is well suited for edge node clustering.

Figure 5:
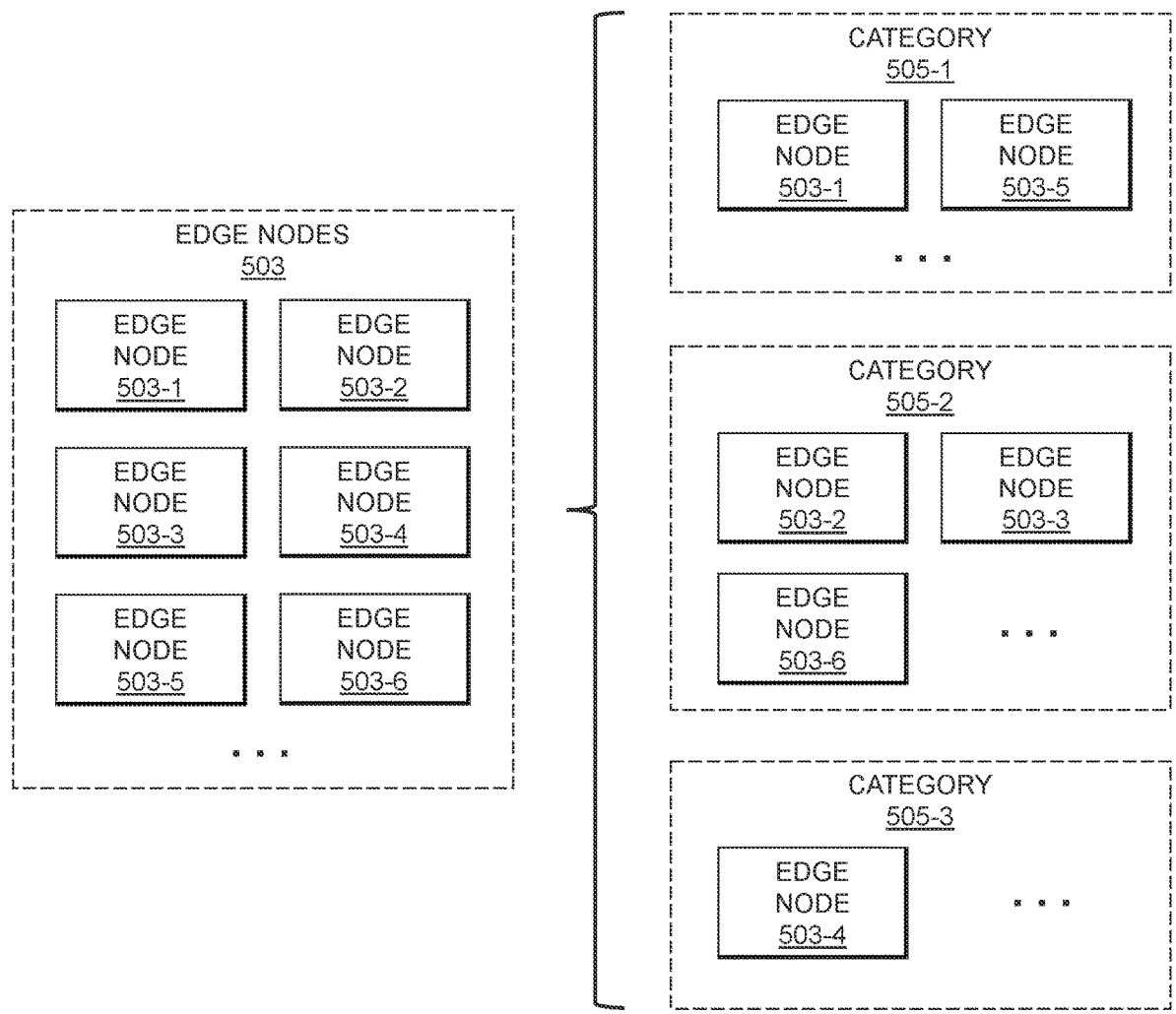
FIG. 5 shows clustering of edge nodes into categories in an illustrative embodiment.

The pre-categorization of edge nodes into clusters or categories by the edge node pre-categorization logic 410 may be executed periodically or in response to various conditions such as determining that the edge computing environment has changed (e.g., determining that some threshold number of edge nodes have been added or removed from the edge computing environment, that a configuration of at least a threshold number of edge nodes in the edge computing environment has changed, etc.). Edge nodes which are clustered into a same category have more similar attributes as well as system performance and anomalies (e.g., bugs, errors or other types of issues). FIG. 5 shows a set of edge nodes 503-1, 503-2, 503-3, 503-4, 503-5, 503-6, etc. (collectively, edge nodes 503) which are clustered into categories 505-1, 505-2, 505-3, etc. (collectively, categories 505). Here, for example: edge nodes 503-1 and 503-5 are clustered into category 505-1; edge nodes 503-2, 503-3 and 503-6 are clustered into category 505-2; and edge node 503-4 is clustered into category 505-3.

Functionality of the historical bug sample analysis logic 412 and the bug similarity evaluation logic 414 will now be described in further detail. When a new bug occurs on the edge node 403, a "footprint" of the bug is collected and reported to the smart log collection optimization system 401 (e.g., which may be implemented in an edge datacenter). The bug footprint is a concise description of the bug. Different user scenarios may have different definitions for bug footprints, but all will contain a detailed description of the bug. FIG. 6 shows an example 600 of a bug footprint which includes a set of fields and corresponding values which provide a detailed description of the bug. In the example 600, the fields include defect, type, component, module, line, method, assert and stack. It should be appreciated, however, that various other fields may be used in addition to or in place of one or more of these fields. Based on the footprint's information, the bug similarity evaluation logic 414 may utilize one or more similarity metrics to determine the similarity between two bugs. In some embodiments, cosine similarity is used to calculate similarity scores. Cosine similarity is advantageously low complexity and well suited for text information retrieval and data mining. The cosine similarity between bugs i and j may be computed as follows:

$$S_{bug\,i,bug\,j} = \frac{\sum_{k=1}^{N} V_{bug\,i,field\,k} \cdot V_{bug\,j,field\,k}}{\sqrt{\sum_{k=1}^{N} (V_{bug\,i,field\,k})^2} \cdot \sqrt{\sum_{k=1}^{N} (V_{bug\,j,field\,k})^2}}$$

where $V_{bug\,i,field\,k}$ represents the digitized value of bug i against field k. Here, the digitized value is a normalized value, where the non-normalized value may be a string or any other format. N denotes the count of fields defined in the footprint. $S_{bug\,i,bug\,j}$ takes a range of values from 0 to 1. A value of 0 indicates that there is no association between the two bugs i and j, and a value of 1 indicates the two bugs i and j are almost same. The closer the value of $S_{bug\,i,bug\,j}$ is to 1, the more similar the two bugs i and j are. For a new bug occurring on edge node 403, the bug similarity evaluation logic 414 may calculate its similarity (e.g., using cosine similarity) against selected historical bugs. The selected historical bugs are defined as at least a designated threshold number of historical bugs which originated on edge nodes belonging to the same category as the edge node 403.

Figure 7:
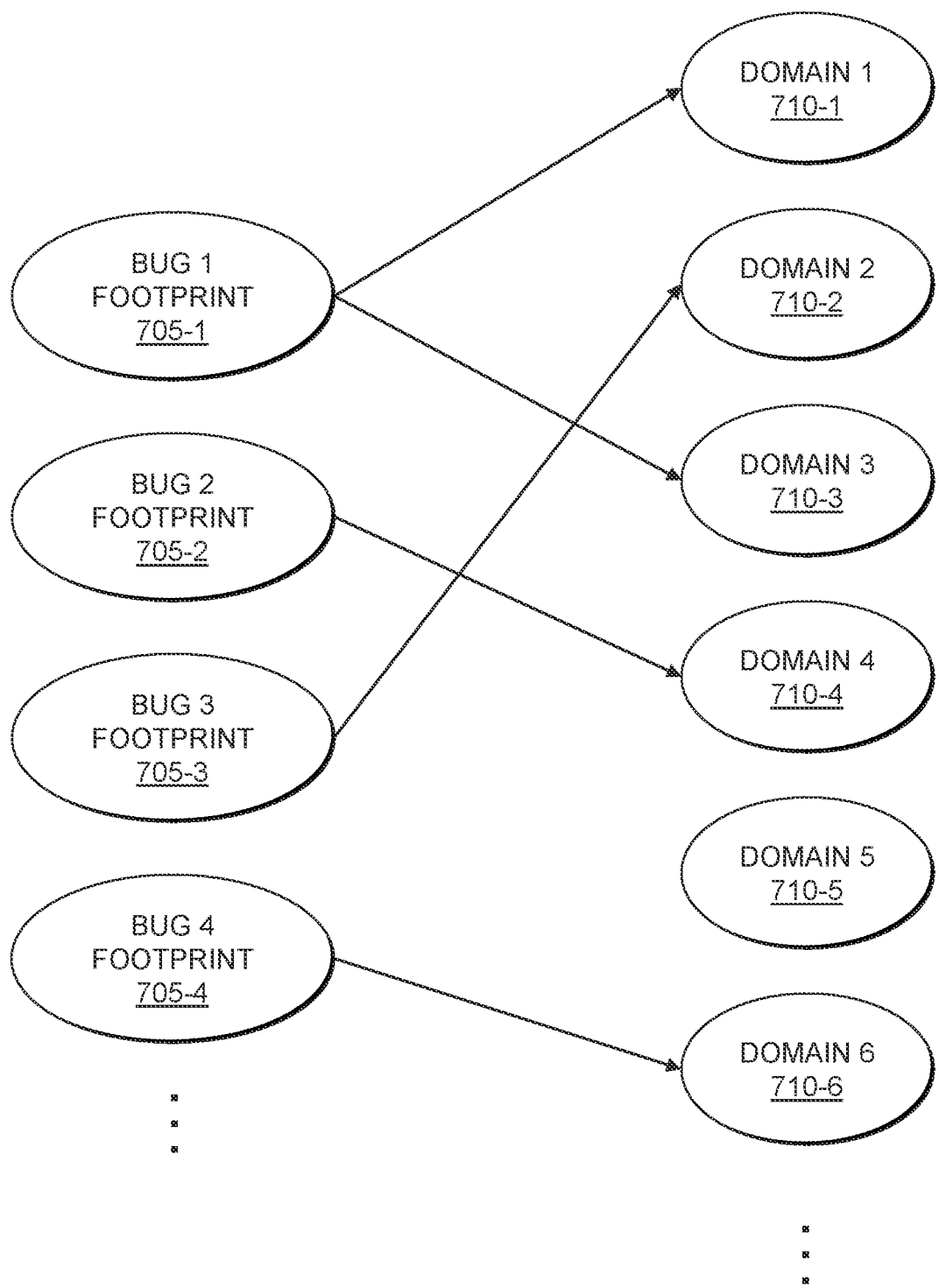
FIG. 7 shows a mapping of bug footprints to different domains in an illustrative embodiment.

Functionality of the log collection target component determination logic 416 will now be described in further detail. The log collection target component determination logic 416, as discussed above, is configured to define a similarity degree threshold ϕ. For historical bugs with a similarity degree higher than the threshold ϕ, the correlated components are selected and added into a multi-target components list. A valid historical bug sample list should include historical bugs that are successfully root caused and fixed, and which are linked to a clear and accurate list of target components from which relevant logs are sourced. Here, logs are "relevant" if they are determined to be useful in either identifying the root cause of a bug or are useful in identifying which remedial actions to take to correct the bug. FIG. 7 shows an example set of footprints for historical bugs 705-1, 705-2, 705-3, 705-4, etc. (collectively, historical bug footprints 705), as well as a set of domains 710-1, 710-2, 710-3, 710-4, 710-5, 710-6, etc. (collectively, domains 710). The domains 710 represent sets of target components. The value of the similarity degree threshold ¢ may be determined by a user for a real-world scenario and the definition may vary with different use case scenarios and accuracy requirements.

Examples will now be described. If, after matching, there exists one or multiple historical bugs with a similarity greater than or equal to a first threshold (e.g., 98%), then those historical bugs are selected and those historical bugs' correlated components are added into the multi-target components list. This scenario corresponds to the newly-encountered bug being a commonly occurring bug (e.g., which may be duplicated across many historical bugs). If, after matching, there are no historical bugs with a similarity greater than or equal to the first threshold (e.g., 98%), but there are historical bugs with a similarity greater than a second threshold (e.g., 88%) and less than the first threshold (e.g., 98%), then such historical bugs are ranked by similarity and the top X (e.g., top 3) historical bugs' correlated components are added into the multi-target components list. This scenario corresponds to the newly-encountered bug being similar to one or more historical bugs and thus the history analysis path is worth being referred to. If, after matching, there are no historical bugs with similarity greater than or equal to the second threshold (e.g., 88%), then manual triage may be triggered. This scenario corresponds to either the newly encountered bug being rare (e.g., not encountered in history) or that the available historical bug data is still not rich. Thus, manual debugging of the newly encountered bug can help enrich the historical bug pool so that a higher similarity hit rate is increased in the future. It should be noted that the examples of values given for the first, second and third thresholds are presented by way of example, and that these thresholds may be customized as desired for a particular use case. By learning from bug handling history, the log collection target component determination logic 416 is configured to evaluate and determine which target components are most needed or useful for collecting the newly encountered bug's debugging and handling.

Figure 8:
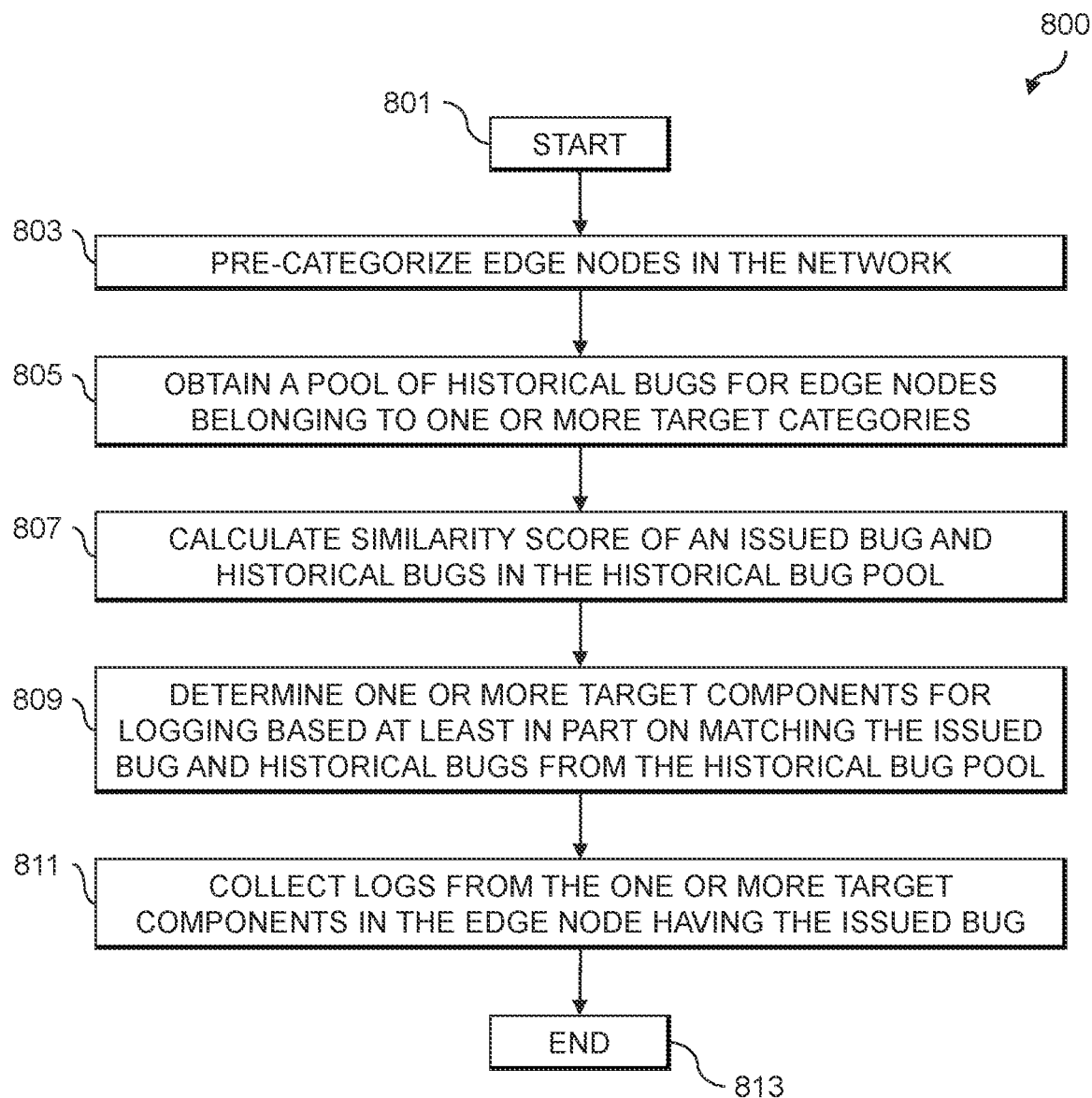
FIG. 8 shows a process flow for determining target components of an edge node for logging in an illustrative embodiment.

FIG. 8 shows a process flow 800 for intelligent collection of needed logs when a bug is encountered on a given edge node (e.g., edge node 403). The process flow 800 may be performed utilizing the smart log collection optimization system 401. The process flow 800 begins in step 801, and edge nodes in a network are pre-categorized (e.g., using the edge node pre-categorization logic 410) in step 803. Step 803 may utilize a mean-shift algorithm to determine the target category (or categories) for the given edge node. In step 805, a pool of historical bugs (e.g., bugs previously encountered on edge nodes in the target category or categories) is obtained for the target category or categories for the given edge node (e.g., utilizing the historical bug sample analysis logic 412). In step 807, a similarity score is calculated for an issued bug (e.g., encountered on the given edge node) and historical bugs in the historical bug pool (e.g., utilizing the bug similarity evaluation logic 414). Target components for logging (e.g., for the issued bug on the given edge node) are then determined in step 809 (e.g., utilizing the log collection target component determination logic 416) based at least in part on matching the issued bug with historical bugs from the historical bug pool. Logs are then collected from the target components in the given edge node having the issued bug in step 811, and the process flow 800 ends in step 813.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for selecting target components of computing devices for logging will now be described in greater detail with reference to FIGS. 9 and 10. Although described in the context of system 100, these platforms may also be used to implement at least portions of other information processing systems in other embodiments.

Figure 9:
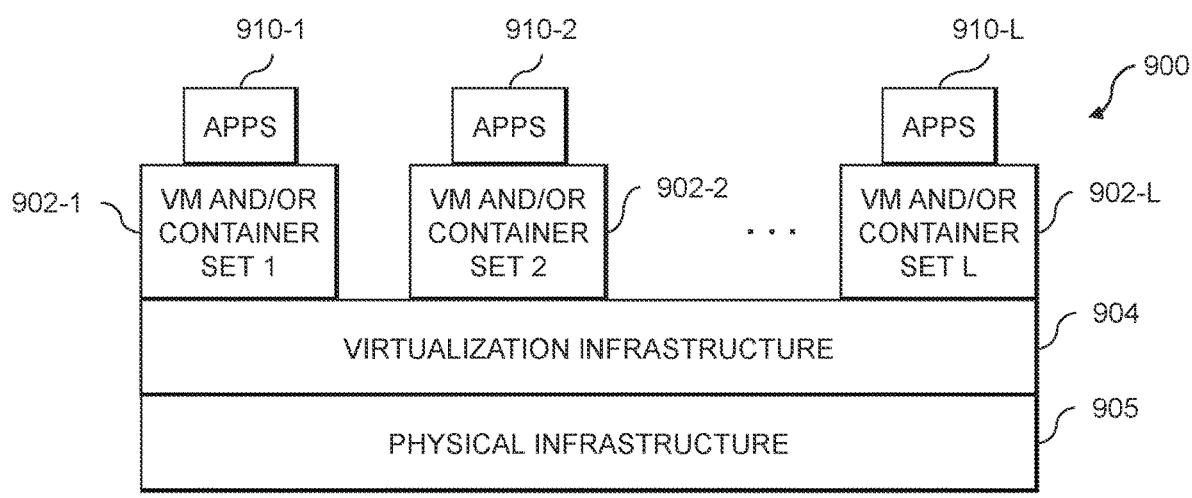
FIGS. 9 and 10 show examples of processing platforms that may be utilized to implement at least a portion of an information processing system in illustrative embodiments.
Figure 10:
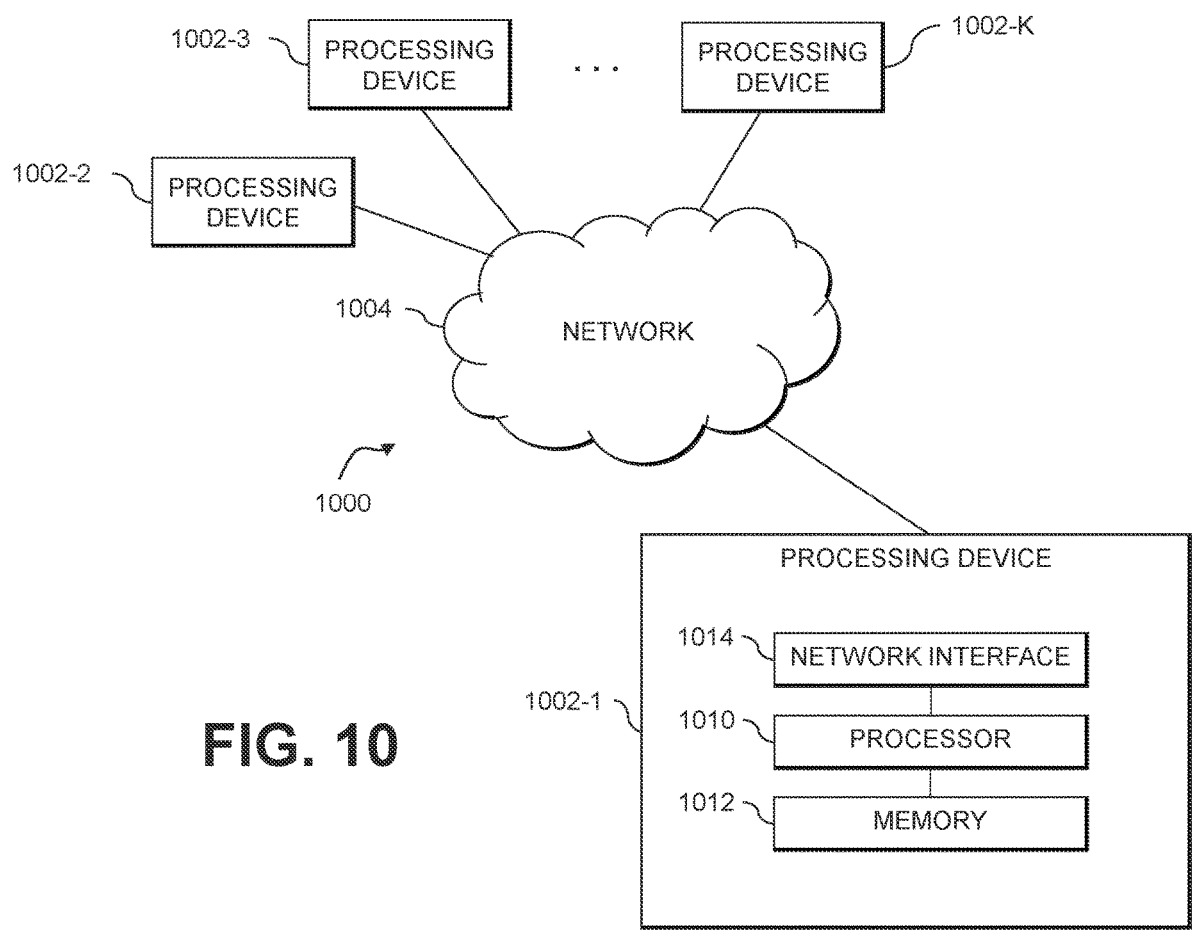

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for selecting target components of computing devices for logging as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to detect a given issue encountered on a given one of a plurality of computing devices in an information technology infrastructure;
   to identify a given one of a set of two or more different clusters of the plurality of computing devices to which the given computing device belongs;
   to determine a similarity between the given issue encountered on the given computing device and one or more historical issues encountered on one or more other ones of the plurality of computing devices belonging to the given cluster;
   to select, based at least in part on the determined similarity between the given issue encountered on the given computing device and the one or more historical issues encountered on the one or more other ones of the plurality of computing devices belonging to the given cluster, a subset of a plurality of components of the given computing device as one or more target components for log collection, the subset of the plurality of components of the given computing device comprising less than all of the plurality of components of the given computing device;
   to collect logs from the subset of the plurality of components of the given computing device;
   to determine, utilizing the collected logs, one or more software components of the given computing device that are a source of the given issue; and
   to apply one or more patches to update the one or more software components of the given computing device which are determined to be the source of the given issue.

2. The apparatus of claim 1 wherein the plurality of computing devices comprise edge computing devices, and wherein the at least one processing device is part of an edge datacenter coupled to the edge computing devices.

3. The apparatus of claim 1 wherein identifying the given cluster to which the given computing device belongs comprises utilizing a mean-shift clustering algorithm.

4. The apparatus of claim 1 wherein determining the similarity between the given issue encountered on the given computing device and a given one of the one or more historical issues encountered on at least one of the one or more other ones of the plurality of computing devices belonging to the given cluster comprises:
   generating a first data structure comprising a plurality of fields describing the given issue; and
   computing a similarity metric between the first data structure and a second data structure comprising the plurality of fields describing the given historical issue.

5. The apparatus of claim 4 wherein computing the similarity metric comprises computing a cosine similarity between the first and second data structures.

6. The apparatus of claim 4 wherein the plurality of fields comprise at least one of:
   at least one identifier of an error occurring on the given computing device;
   at least one identifier of a code file that is the source of the error occurring on the given computing device; and
   at least one identifier of a location in the code file that is a cause of the error occurring on the given computing device.

7. The apparatus of claim 4 wherein the plurality of fields comprise at least one identifier of one or more software components running on the given computing device that are affected by the given issue occurring on the given computing device.

8. The apparatus of claim 1 wherein at least a given one of the one or more historical issues encountered on the one or more other ones of the plurality of computing devices belonging to the given cluster is associated with a root cause and at least one remedial action for resolving the given historical issue.

9. The apparatus of claim 1 wherein at least a given one of the one or more historical issues encountered on the one or more other ones of the plurality of computing devices belonging to the given cluster is linked with one or more target components that are a source of logs having information used for diagnosing the given historical issue.

10. The apparatus of claim 1 wherein determining the similarity between the given issue encountered on the given computing device and the one or more historical issues encountered on the one or more other ones of the plurality of computing devices belonging to the given cluster comprises:

determining whether any of the one or more historical issues exhibit at least a first threshold level of similarity to the given issue; and responsive to determining that none of the one or more historical issues exhibit at least the first threshold level of similarity to the given issue, determining whether any of the one or more historical issues exhibit at least a second threshold level of similarity to the given issue, the second threshold level of similarity being less than the first threshold level of similarity.

11. The apparatus of claim 10 wherein selecting the subset of the plurality of components of the given computing device as the one or more target components for log collection comprises selecting target components that are linked with ones of the one or more historical issues having at least the first threshold level of similarity with the given issue.

12. The apparatus of claim 10 wherein selecting the subset of the plurality of components of the given computing device as the one or more target components for log collection comprises selecting target components that are linked with a subset of the one or more historical issues exhibiting at least the second threshold level of similarity with the given issue.

13. The apparatus of claim 1 wherein determining the one or more software components of the given computing device that are the source of the given issue comprises performing a root cause analysis of the given issue utilizing the logs collected from the subset of the plurality of components of the given computing device.

14. A computer program product comprising a non-transitory processor-readable storage medium having stored therein program code of one or more software programs, wherein the program code when executed by at least one processing device causes the at least one processing device:

to detect a given issue encountered on a given one of a plurality of computing devices in an information technology infrastructure;

to identify a given one of a set of two or more different clusters of the plurality of computing devices to which the given computing device belongs;

to determine a similarity between the given issue encountered on the given computing device and one or more historical issues encountered on one or more other ones of the plurality of computing devices belonging to the given cluster;

to select, based at least in part on the determined similarity between the given issue encountered on the given computing device and the one or more historical issues encountered on the one or more other ones of the plurality of computing devices belonging to the given cluster, a subset of a plurality of components of the given computing device as one or more target components for log collection, the subset of the plurality of components of the given computing device comprising less than all of the plurality of components of the given computing device;

to collect logs from the subset of the plurality of components of the given computing device;

to determine, utilizing the collected logs, one or more software components of the given computing device that are a source of the given issue; and to apply one or more patches to update the one or more software components of the given computing device which are determined to be the source of the given issue.

15. The computer program product of claim 14 wherein at least a given one of the one or more historical issues encountered on the one or more other ones of the plurality of computing devices belonging to the given cluster is associated with a root cause and at least one remedial action for resolving the given historical issue.

16. The computer program product of claim 14 wherein at least a given one of the one or more historical issues encountered on the one or more other ones of the plurality of computing devices belonging to the given cluster is linked with one or more target components that are a source of logs having information used for diagnosing the given historical issue.

17. A method comprising:

detecting a given issue encountered on a given one of a plurality of computing devices in an information technology infrastructure;

identifying a given one of a set of two or more different clusters of the plurality of computing devices to which the given computing device belongs;

determining a similarity between the given issue encountered on the given computing device and one or more historical issues encountered on one or more other ones of the plurality of computing devices belonging to the given cluster;

selecting, based at least in part on the determined similarity between the given issue encountered on the given computing device and the one or more historical issues encountered on the one or more other ones of the plurality of computing devices belonging to the given cluster, a subset of a plurality of components of the given computing device as one or more target components for log collection, the subset of the plurality of components of the given computing device comprising less than all of the plurality of components of the given computing device;

collecting logs from the subset of the plurality of components of the given computing device;

determining, utilizing the collected logs, one or more software components of the given computing device that are a source of the given issue; and applying one or more patches to update the one or more software components of the given computing device which are determined to be the source of the given issue;

wherein the method is performed by at least one processing device comprising a processor coupled to a memory.

18. The method of claim 17 wherein at least a given one of the one or more historical issues encountered on the one or more other ones of the plurality of computing devices belonging to the given cluster is associated with a root cause and at least one remedial action for resolving the given historical issue.

19. The method of claim 17 wherein at least a given one of the one or more historical issues encountered on the one or more other ones of the plurality of computing devices belonging to the given cluster is linked with one or more target components that are a source of logs having information used for diagnosing the given historical issue.

20. The method of claim 17 wherein determining the similarity between the given issue encountered on the given computing device and a given one of the one or more historical issues encountered on at least one of the one or more other ones of the plurality of computing devices belonging to the given cluster comprises:

generating a first data structure comprising a plurality of fields describing the given issue; and computing a similarity metric between the first data structure and a second data structure comprising the plurality of fields describing the given historical issue.

\* \* \* \* \*